Jan. 15, 1924.

C. LE G. FORTESCUE 1,480,710

BALANCING SYSTEM

Filed Oct. 17, 1918

WITNESSES:
H. J. Shelhamer
A. A. Brand

INVENTOR
Charles LeG. Fortescue
BY
ATTORNEY

Patented Jan. 15, 1924.

1,480,710

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

BALANCING SYSTEM.

Application filed October 17, 1918. Serial No. 258,578.

*To all whom it may concern:*

Be it known that I, CHARLES LE G. FORTESCUE, a subject of Great Britain, and a resident of Pittsburgh, in the county of Allegheny and State of Pennsylvania, have invented a new and useful Improvement in Balancing Systems, of which the following is a specification.

My invention relates to balancing means for polyphase distribution systems and has for its object to provide means of the character designated which shall not only restore the phase relations of the system to proper balanced conditions but shall also operate to preclude the flow to apparatus operated from said system of currents having undesirable frequencies and therefore an unbalancing tendency.

Figure 1:
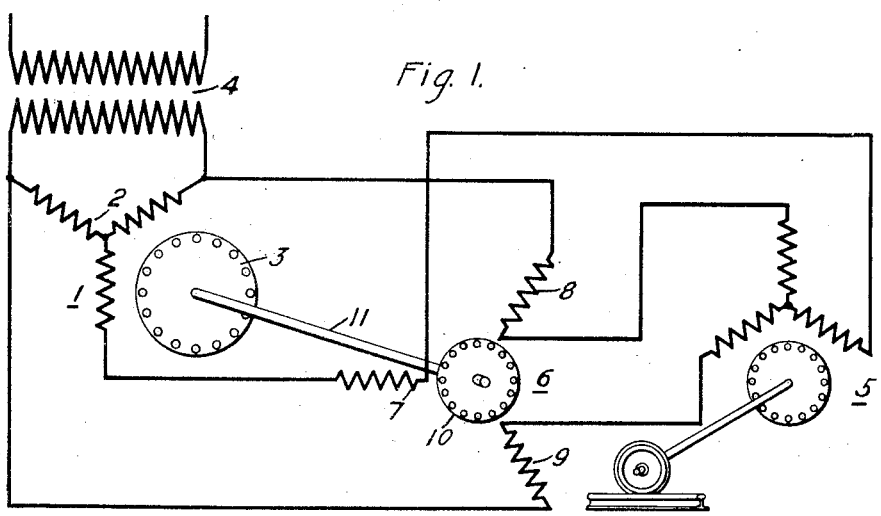
Figure 2:
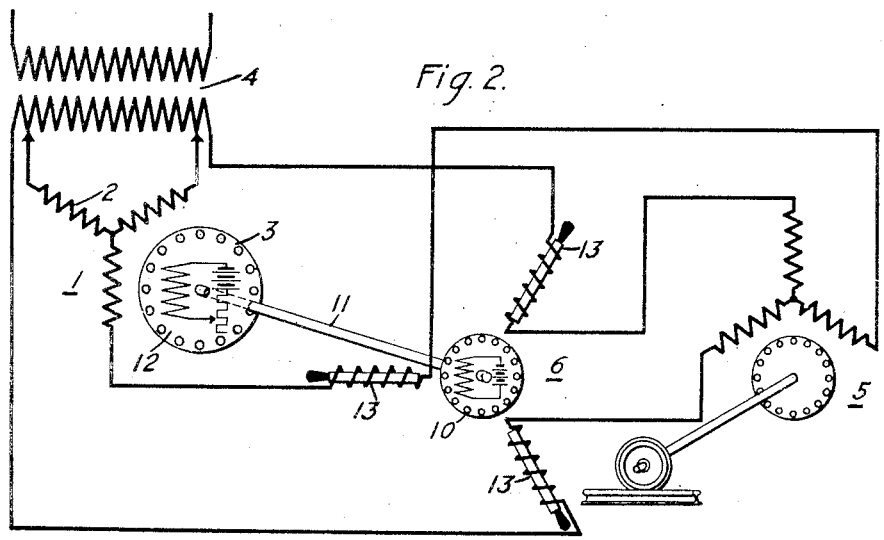

In the accompanying drawing, Fig. 1 is a diagrammatic view of a system embodying my invention wherein the balanced effect is produced by an auxiliary machine of the induction type and Fig. 2 is a diagrammatic view of a modification of the system of Fig. 1 embodying an auxiliary machine of the synchronous type.

It is frequently desirable to operate electrical devices requiring currents of a predetermined frequency from a source of supply in which currents of other frequencies as well as the frequency desired may be flowing and it is, therefore, necessary to associate with such a source of supply and electrical device, an apparatus of such character that currents of the desired frequency will be fed to the electrical device but those currents which may produce an unsatisfactory effect upon the device are precluded from flowing thereto.

It is well known that an induction machine operating at synchronous speed draws only magnetizing current from the system upon which it is operated and that, therefore, the primary member of such an induction machine constitutes an impedance of extremely high value for currents of the frequency corresponding to the machine speed. If, therefore, a machine of the character described is associated in a series sense with an electrical circuit in which currents of different frequencies are flowing, the speed thereof may be so arranged, or the pole number may be so varied that currents having the undesirable frequency will be prevented from flowing to any electrical device which may be desired to feed from the distribution system.

Moreover, it is apparent that if an asynchronous or a synchronous machine be connected between the source of energy supply and the apparatus to be operated and the speed thereof properly controlled, this machine may also operate to balance the phase relations of the voltages of the main circuit, all as will be hereinafter described.

As disclosed on page 28 et seq. of the Electric Journal for Jan. 17, 1917, in an article by R. E. Gilman and the applicant entitled "Single-phase power service from central stations," any unbalanced polyphase system may be resolved into two component balanced polyphase systems having opposite phase-sequence.

When these two oppositely rotating systems become equal to each other, the original polyphase system reduces to a single-phase function. A single-phase system is, therefore, the limiting and severest case of an unbalanced polyphase system. My phase balancing system means may, therefore, be applied equally well to systems wherein it is desired to preserve the balance in a polyphase system from which a single-phase load is being drawn.

I find if an auxiliary balancing dynamo-electric machine of either the synchronous or asynchronous type be provided with distinct phase divisions in its armature winding and if these distinct phase-divisions are inserted in the respective mains of a polyphase system subject to unbalancing, the machine being driven in relative synchronism with respect to one of the balanced components of the unbalanced system, that the synchronous impedance thereof effectually damps or chokes out that balanced component to which the machine is operating in relative synchronism, producing substantially no effect on the remaining component.

As the degree of unbalance in the usual polyphase system is such that the resolution is into a relatively large balanced component having a positive phase sequence and a relatively small component having a backward phase sequence, it follows that by the use of a relatively small machine, the minor component may be effectually suppressed and the major component remain to energize the system in a balanced manner.

Referring to Fig. 1 of the drawing for a more detailed understanding of my invention, I show a phase-converter at 1, comprising a polyphase stator member 2 and a rotor member 3 provided with a squirrel-cage winding, as is well known in the art, the machine 1 being structurally similar to the ordinary polyphase induction motor.

Single-phase energy from an appropriate source 4 is supplied to the converter 1 and polyphase energy, supplied jointly directly from the source 4 and indirectly through the converter 1, is supplied to a polyphase load, such, for example, as a railway propulsion motor 5 of the induction type.

Conversely, during recuperation, the machine 5 produces polyphase currents that are transmitted directly to the transformer 4 and through the converter 1, for the regeneration of energy.

As is well known and understood in the art, the effect of the ohmic and inductive drops in the converter 1 is to distort the polyphase electromotive forces derived from this machine under load conditions, as pointed out in detail in U. S. Patent 1,243,430 issued to the Westinghouse Electric & Mfg. Company on an application filed by B. G. Lamme.

I find that this effect may be largely eliminated by the use of an auxiliary machine 6 similar to an ordinary polyphase induction motor and comprising primary windings 7, 8 and 9 and a secondary winding 10, the latter being shown as mounted on the rotor although obviously the rotor member may either be the primary or the secondary member. The component phase-divisions 7, 8 and 9 of the primary winding are conductively distinct from each other within the machine 6 and are inserted, respectively, in the supply conductors between the converter 1 and the motor 5 and the connections are such that when the rotor 10 is driven or runs in the same direction as the rotor member 3, as by virtue of an interconnecting shaft 11, the phase-sequence within the machine 6 is in the opposite direction from the phase-sequence in the converter 1. The number of poles in the machine 6 should be the same as in the machine 1, assuming a direct shaft connection therebetween, whereby the frequency tending to be generated in the machine 6 is the same as that generated in the machine 1.

While I have shown my auxiliary machine as provided with the same number of poles as the main machine, a harmonic of an order higher than the fundamental may be eliminated from the operated machine by supplying the requisite number of poles to the auxiliary machine 6 and driving this machine at substantially synchronous speed of the fundamental. On the other hand, the same result may be obtained by driving the auxiliary machine from a separate operating means at a speed of substantially synchronism with the higher harmonic assuming that no change is made in the number of poles.

Having thus described the arrangement of a system embodying my invention, the operation is as follows. Assuming that the machine 1 is started in operation and is supplying energy to the motor 5, the energy in the polyphase mains will be of the frequency of the source 4 but will tend to be unbalanced because of the drops in the machine 1.

The unbalanced polyphase currents may be resolved into a forwardly rotating major balanced phase component of the frequency of the supply 4 and a backwardly rotating minor component of like frequency. The backward phase-sequence of the machine 6 causes this machine to operate in relative synchronism with respect to said minor component. Thus the effect of the machine 6 is to oppose its synchronous impedance to the backwardly rotating component while exercising little or no effect with respect to the major forwardly rotating component. By this means, the minor component is effectually suppressed and the resultant electromotive force supplied to the motor 5 is balanced.

I have shown the machine 6 rigidly coupled to the machine 1 so as to ensure that the machine 6 shall operate at all times, even though the load currents flowing therethrough are so small in value as to prevent the development of adequate driving torque therein but if the load currents are of such value as to maintain the desired torque, the shaft 11 may be eliminated, permitting the machine 6 to float on the system, operating as an asynchronous machine and developing substantially its full synchronous impedance, the machine being prevented from operating at synchronous speed only by the relatively small slip occasioned by the friction, windage and losses.

As hereinbefore stated in connection with the construction of a system according to my invention, it is obvious that the desired eradication of undesirable harmonics may be accomplished by running the auxiliary machine 6 at the synchronous speed of the harmonic current which it is desired to eliminate from the system.

Referring to the form of my invention shown in Fig. 2, the general elements are the same as previously described, except that the converter 1 is of the synchronous type, this effect being produced by the addition of a unidirectional exciting winding 12 to the secondary member. The auxiliary machine 6 is also of the synchronous type and may either be rigidly connected to the converter 1 or operated as a synchronous motor. In the former case, means should be provided for circumferentially shifting the pole axes, this effect being indicated by suitable handles 13, shown applied to the field poles of the machine 6. The synchronous operation of the machine 6 permits the development of the full synchronous impedance thereof, thus ensuring a maximum balancing effect for a given machine.

I am aware that it has been proposed hitherto to balance the electromotive forces of an unbalanced polyphase system by connecting an auxiliary machine in shunt relation thereto, this machine offering substantially zero impedance to the backwardly rotating phase component, thus short-circuiting this undesired component and rendering the resultant electromotive forces of the system balanced in nature, all as shown, for example, in U. S. Reissue Patent No. 14,133. I believe, however, that I am the first to propose the employment of an auxiliary machine connected in series relation to impose a high synchronous impedance to the flow of unbalanced phase component currents.

From another viewpoint, the machine 6 of Fig. 1 may be considered as a rotating or general transformer, inductively interlinking the leads directly from the source 4 to the motor 5 with the tertiary lead from the converter 1 to the motor 5, as described in my copending application, Serial No. 193,726, filed Sept. 28, 1917, patented Sept. 24, 1918, No. 1,280,007, and assigned to the Westinghouse Electric & Manufacturing Company, a static transformer being employed in the system of this copending application. Obviously, by the use of a general transformer, a much more flexible transfer of energy and effective balancing action is secured.

Since, as has hereinbefore been pointed out, a single-phase system is a case of pure unbalance, the machine 6 may be used in this connection to preserve the balance of a polyphase system from which a single-phase load is drawn. That is, with a single-phase load, consisting as it does, of two equal and oppositely rotating component polyphase balanced systems, it is only necessary to prevent one of the equal rotating components of the single-phase system from being imposed upon the balanced polyphase source in order to maintain balance therein. Therefore, the machine 6 may be connected in series between the single-phase load and the polyphase system and run at such a speed that the undesired equal component will be damped out and the remaining balanced polyphase component will be superimposed upon the original balanced polyphase system in such a way that no unbalancing effect is engendered therein.

It will be noted that a group or system of polyphase conductors may be defined broadly as any conductors having a plurality of phases therebetween, said phases forming a closed polygon of forces when added vectorially. In certain of my appended claims, therefore, I shall define the unbalanced system of conductors which connect the shunt converter 1 and the series converter 6 by reference to the fundamental definition of a polyphase circuit just stated.

While I have shown my invention in its preferred forms, it will be obvious to those skilled in the art that it is not so limited but is susceptible of various minor changes and modifications without departing from the spirit thereof and I desire, therefore, that only such limitations shall be placed thereupon as are imposed by the prior art or are specifically set forth in the appended claims.

I claim as my invention:

1. The method of interchanging balanced currents between a balanced polyphase system and an unbalanced polyphase system of the same frequency, which consists in opposing currents of one phase sequence without substantially opposing currents of another phase-sequence.

2. The combination with a circuit having two component electromotive forces, of an induction machine having its primary winding connected in series with said circuit and having its secondary winding relatively rotating at a substantially synchronous speed corresponding to only one of said component electromotive-forces, said component electromotive forces being of such nature as to tend to drive said induction machine at different speeds, whereby the induction machine offers a relatively low impedance to the other component electromotive force.

3. The combination with an alternating-current system having two component electromotive-forces, of a system carrying currents corresponding to only one of said components, and a dynamo-electric machine connecting said systems for precluding the flow of currents corresponding to the other of said component electromotive forces therebetween, said component electromotive-forces being of such nature as to tend to drive said dynamo-electric machine at different speeds.

4. The combination with an alternating current system having two component electromotive forces, of a system carrying currents corresponding to only one of said components, and an independent dynamo-electric machine connecting said systems for precluding the flow of currents corresponding to the other of said component electromotive forces therebetween, said component electromotive forces being of such nature as to tend to drive said dynamo-electric machine at different speeds.

5. The combination with an unbalanced polyphase circuit having two balanced component alternating electromotive forces of the same frequency but opposite phase-sequence, of an induction machine having its primary winding connected in series with said circuit and having its secondary winding relatively rotating at a substantially synchronous speed corresponding to one of said component electromotive forces, whereby the induction machine offers a relatively low impedance to the other component electromotive force.

6. The combination with an unbalanced polyphase system having two balanced component electromotive-forces of the same frequency but opposite phase-sequence, of a balanced polyphase system carrying currents of the said frequency but only one phase sequence, and an independent dynamo-electric machine connecting said systems for precluding the flow of current of the opposite phase sequence.

7. In a three-phase system of distribution, the combination with an unbalanced system of polyphase conductors, of a balanced system of polyphase conductors, and an independent dynamo-electric machine connecting said unbalanced system and said balanced system for precluding the flow of unbalancing currents therebetween.

8. In a polyphase system of distribution, the combination with an unbalanced supply network, of load requiring balanced currents, and an independent dynamo-electric machine inserted in series with said load for maintaining balanced currents in said load regardless of the condition of unbalance of said supply network.

9. The combination with a single-phase system, of a polyphase system having balanced voltages, a phase converter interconnecting said systems for interchange of energy therebetween, and an independent dynamo-electric machine connected in series with said converter and said polyphase system for preventing the transmission of unbalancing components of current from the converter to said polyphase system.

10. The combination with a single-phase system, of a polyphase system having balanced voltages, a phase converter interconnecting said systems for interchange of energy therebetween, and an induction machine having a primary winding connected in series with said converter and said polyphase system and having a low-impedance, polyaxially short-circuited secondary winding rotating backwardly with respect to said primary winding at substantially synchronous velocity corresponding to said polyphase system, whereby the induction machine offers a relatively low impedance to balanced currents corresponding to said polyphase system.

11. The combination with a single-phase translating device, of a polyphase translating device, a shunt-connected dynamo-electric phase converter associated with said translating devices for effecting an energy interchange therebetween, and a series-connected dynamo-electric phase balancer connected between said converter and said polyphase translating device for substantially preventing the flow of any but balanced currents.

12. In an electrical system, the method of transferring power between single-phase conductors and main polyphase conductors in a system having auxiliary polyphase conductors in which the single-phase conductors are connected to one phase of said auxiliary conductors, which comprises effecting an energy interchange between the phases of said auxiliary conductors such as to maintain a voltage balance which is only approximately perfect, and selectively impeding the flow of negative-phase-sequence current-components in said auxiliary conductors.

13. In an electrical supply system, the combination with a balanced polyphase translating device, of polyphase conductors connected thereto, an unbalanced translating device connected to said conductors, a phase-balancer connected in shunt with said conductors between said translating devices, and a polyphase induction machine connected in series circuit relationship with said conductors between said balanced translating device and said phase-balancer in such manner as to offer a synchronous impedance to unbalancing currents of reverse phase sequence.

14. A system as specified in claim 13, including as the phase-balancer a polyphase induction machine, in combination with means effective during the normal operation of the system for driving the rotor of the series machine from an external source of mechanical energy.

15. A system as specified in claim 14, including a unidirectional exciting means for said phase-balancer.

16. A system as specified in claim 13, including a unidirectional exciting means for said series machine.

17. A system as specified in claim 13, including as the phase-balancer a synchronous polyphase induction machine, in combination with a unidirectional exciting means for the series machine, and means whereby the rotor of said series machine may be driven from the rotor of said phase-balancer and whereby the phase angle of said series-machine rotor with respect to its stator may be adjusted.

18. The combination with a circuit having two component electromotive forces, of an induction machine having a primary winding connected in series with said circuit and a low-impedance, poly-axially short-circuited secondary winding relatively rotating at a synchronous speed corresponding to only one of said component electromotive-forces, and unidirectional exciting means for said secondary winding, said component electromotive forces being of such nature as to tend to drive said induction machine at different speeds, whereby the induction machine offers a relatively low impedance to the other component electromotive forces.

19. In a polyphase system of distribution, the combination with an unbalanced translating device, of a balanced translating device, a dynamo-electric machine connecting said devices for precluding the flow of unbalancing currents therebetween, and a unidirectional exciting means for said dynamo-electric machine.

20. In a polyphase electrical system, the combination with a polyphase source of supply and translating devices supplied thereby, of an induction machine connected between said source and certain of said translating devices in series with the latter, means for causing said induction machine to rotate against the action of the revolving field of the polyphase currents flowing through the machine, said induction machine having its primary connected to protect the translating devices against dissymmetrical voltage, said induction machine having its primary connected to oppose the current flow impelled by the dissymmetrical voltage.

21. An electrical system comprising a polyphase network having a balanced portion and an unbalanced portion, and a series balancer for automatically balancing the polyphase currents flowing between said portions, said series balancer comprising a dynamo-electric machine having a damper winding and having its rotor running backwardly at substantially synchronous speed.

22. The combination with a polyphase circuit which is subject to unbalanced conditions therein, of a second polyphase circuit requiring balanced conditions therein, means for interconnecting said circuits for interchange of power, and dynamo-electric means connected in series-circuit relation to said interconnecting means for maintaining substantial balance in said second circuit.

23. The combination with a polyphase circuit which is subject to unbalanced conditions, of a second polyphase circuit requiring balanced conditions, means for interconnecting said circuits for interchange of power, and an induction machine having a polyphase primary winding connected in series-circuit relation to said interconnecting means and a closed-circuited secondary winding rotating backwardly at substantially synchronous speed, whereby said induction machine tends to maintain balanced conditions in said second circuit.

24. In a polyphase system of distribution, the combination with an unbalanced translating device, of a balanced translating device and dynamo-electric means connecting said devices for precluding the flow of unbalancing currents therebetween.

25. In a polyphase system of distribution, the combination with an unbalanced supply network, of a load requiring balanced currents, and dynamo-electric means inserted in series with said load for maintaining balanced currents in said load regardless of the condition of unbalance of said supply network.

26. In a polyphase system of distribution, the combination with an unbalanced translating device, of a balanced translating device, and an induction machine having a polyphase primary winding connecting said devices and a closed-circuited secondary winding rotating backwardly at substantially synchronous speed, whereby said induction machine tends to maintain balanced conditions in said balanced translating device.

27. In a polyphase system of distribution, the combination with an unbalanced supply network, of a load requiring balanced currents, and an induction machine having a polyphase primary winding inserted in series with said load and a closed-circuited secondary winding rotating backwardly at substantially synchronous speed, whereby said induction machine tends to maintain balanced conditions in said load.

28. The combination including a balanced polyphase translating device, an unbalancing translating device, and means connecting said unbalancing translating device for interchange of balanced polyphase energy with said balanced translating device, said means including a polyphase induction machine having its primary connected in series-circuit relation to said connecting means and its secondary rotating backwardly at substantially synchronous speed with respect to its primary, said polyphase induction machine opposing a high impedance to the flow of currents having a phase-sequence corresponding to the direction of rotation.

29. In a polyphase electrical system, the combination with a polyphase source of supply and a translating device supplied thereby, of an independent induction machine connected between said source and said translating device in series with the latter, and means for causing said induction machine to rotate against the action of the revolving field of the polyphase currents flowing through the machine, whereby said induction machine opposes a high impedance to undesired symmetrical current-components having a phase-sequence corresponding to the direction of rotation.

30. In a polyphase electrical system, the combination with a polyphase source of supply and a translating device supplied thereby, of an independent induction machine connected between said source and said translating device in series with the latter, and means for causing said induction machine to rotate with a slip of substantially 200% against the action of the revolving field of the polyphase currents flowing through the machine, whereby substantially balanced currents are maintained by reason of the high impedance of said machine to the flow of currents having a phase-sequence corresponding to the direction of rotation thereof.

31. In a polyphase electrical system, the combination with a polyphase source of supply and a translating device supplied thereby, of an induction machine connected between said source and said translating device in series with the latter, means for causing said induction machine to rotate against the action of the revolving field of the polyphase currents flowing through the machine, said induction machine having its primary connected to protect the translating device against dissymmetrical voltage, said induction machine having its primary connected to oppose the current flow impelled by the dissymmetrical voltage.

32. The combination, with a balanced three-phase system and an unbalanced three-phase system, of a dynamo-electric machine having a three-phase primary winding connected in series-circuit relation between said systems and having a polyaxially short-circuited secondary winding rotating backwardly at approximately synchronous speed with respect to the currents in the primary winding.

33. The combination with a substantially balanced polyphase system, of an unbalanced system having the same number of phases as said balanced system, circuits interconnecting said systems for the interchange of power, the phases of said unbalanced system having dissymmetrical electromotive forces which, when vectorially added, are capable of forming a closed polygon of forces, and a dynamo-electric machine having a primary winding of like phase-number connected in series-circuit relation with said interconnecting circuits and having a polyaxially closed-circuited secondary winding rotating backwardly at approximately synchronous speed with respect to the currents in the primary winding.

34. The combination with a substantially balanced polyphase system including phases which are displaced by 120° phase difference, of an unbalanced system having the same number of phases as said balanced system, circuits interconnecting said systems for the interchange of power, the phases of said unbalanced system having dissymmetrical electromotive forces which, when vectorially added, are capable of forming a closed polygon of forces, and a dynamo-electric machine having a primary winding of like phase-number connected in series-circuit relation with said interconnecting circuits and having a polyaxially closed-circuited secondary winding rotating backwardly at approximately synchronous speed with respect to the currents in the primary winding.

35. A system comprising a three-phase translating device, an unbalancing translating device, an auxiliary induction machine having primary windings connected in series between said translating devices, and having an independent short-circuited secondary winding rotating backwardly with respect to the phase sequence of the primary currents, and a phase balancer connected in parallel to the unbalanced translating device at a point intermediate the same and said induction machine.

36. A system comprising polyphase supply mains, an unbalanced load therefor, an auxiliary induction machine having primary windings connected in series between said supply mains and said load and having an independent short-circuited secondary winding rotating backwardly with respect to the phase sequence of the primary currents, and a phase balancer connected in parallel to the load at a point intermediate the load and said induction machine, said phase balancer having a damper winding.

37. A system comprising polyphase supply mains, an unbalanced load therefor, a balancing machine, an asynchronous machine rotating backwardly with respect to the phase sequence of its primary currents and mechanically connected to said balancing machine, the unbalanced load being connected to the terminals of the balancing machine and the latter in turn connected to the mains in such manner that the primary phase windings of the asynchronous machine are between the mains and the balancing machine.

38. In combination, a single-phase system, a substantially balanced polyphase system, a shunt phase-converter machine coupled to said single-phase system, coupling means connecting said substantially balanced system to the terminals of said shunt converter machine, a series phase-balancer machine and means for connecting said series balancer machine in series-circuit relation to said coupling means for precluding the flow of negative-phase-sequence currents therethrough.

39. In combination, a single-phase system, a substantially balanced polyphase system, a shunt phase-converter machine coupled to said single-phase system, coupling means connecting said substantially balanced system to the terminals of said shunt converter machine, a series phase-balancer machine, means for connecting said series balancer machine in series-circuit relation to said coupling means, and means for exciting said shunt converter machine.

40. The combination with two systems of polyphase conductors, at least one of which is unbalanced, of connecting means therebetween for effecting an interchange of power, and means for causing the interchanged currents to be substantially balanced, said last-mentioned means comprising an induction machine having primary windings connected in series-circuit relation to said connecting means, and having a damper winding relatively rotating backwardly at substantially synchronous speed with respect to the interchanged currents in the primary windings.

41. The combination with two systems of polyphase conductors, at least one of which is unbalanced, said systems including phases which are displaced by 120° phase difference, of connecting means therebetween for effecting an interchange of power, and means for causing the interchanged currents to be substantially balanced, said last-mentioned means comprising an induction machine having primary windings connected in series-circuit relation to said connecting means, and having a damper winding relatively rotating backwardly at substantially synchronous speed with respect to the interchanged currents in the primary windings.

42. In a polyphase electrical system, the combination with a polyphase source of supply and translating devices supplied thereby, of an induction machine connected between said source and certain of said translating devices in series with the latter, means for driving said induction machine against the action of its revolving field, said induction machine having its primary connected to protect the translating devices against dissymmetrical voltage, said induction machine having its primary connected to oppose the flow of the dissymmetrical voltage.

43. A system comprising polyphase supply mains, an unbalanced load therefor, an auxiliary induction machine having primary windings connected in series between said supply mains and said load and short-circuited secondary windings rotating backwardly with respect to the phase sequence of the primary currents, and a phase balancer connected in parallel with the load at a point intermediate the load and said induction machine.

44. A system comprising polyphase supply mains, an unbalanced load therefor, an auxiliary induction machine having primary windings connected in series between said supply mains and said load and short-circuited secondary windings rotating backwardly with respect to the phase sequence of the primary currents, and a phase balancer connected in parallel with the load at a point intermediate the load and said induction machine, said phase balancer having a damper winding.

45. The combination with two polyphase mains, of a series balancer machine having the same number of phases as the two polyphase systems and having a good damper winding relatively rotating backwardly at substantially synchronous speed, the respective phases of the primary windings of said balancer machine serially connecting the several phases of said two polyphase mains, one of said polyphase mains having both polyphase and single-phase apparatus thereon whereby the voltages are unbalanced, the other of said mains having more nearly balanced voltages, and the serially connected machine opposing a high impedance to the flow of currents having a phase-sequence corresponding to the direction of rotation of said machine.

46. The combination with two alternating-current mains, of means for serially connecting the same, comprising a series machine having a good damper winding, one of said mains having electromotive forces comprising fundamental and harmonic components, said series machine operating substantially in synchronism with one of said components whereby the current flow corresponding to said component is substantially prevented.

In testimony whereof, I have hereunto subscribed my name this 26th day of Sept., 1918.

CHARLES LE G. FORTESCUE.